(12) United States Patent
Aoyama

(10) Patent No.: US 8,670,057 B2
(45) Date of Patent: Mar. 11, 2014

(54) IMAGE CAPTURING DEVICE AND IMAGE CAPTURING METHOD

(75) Inventor: Chiaki Aoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 13/229,940

(22) Filed: Sep. 12, 2011

(65) Prior Publication Data

US 2012/0062778 A1     Mar. 15, 2012

(30) Foreign Application Priority Data

Sep. 13, 2010  (JP) ................. 2010-204581

(51) Int. Cl.
- *H04N 3/14* (2006.01)
- *H04N 5/228* (2006.01)
- *G06K 9/40* (2006.01)

(52) U.S. Cl.
USPC .............. 348/294; 348/222.1; 382/260

(58) Field of Classification Search
USPC ........ 348/222.1, 294–324; 382/260, 264, 321
See application file for complete search history.

(56) References Cited

U.S. PATENT DOCUMENTS

| | | | |
|---|---|---|---|
| 4,766,561 A * | 8/1988 | Thompson et al. | 708/316 |
| 8,154,628 B2 * | 4/2012 | Ishida et al. | 348/241 |
| 2009/0290053 A1 * | 11/2009 | Hammerschmidt | 348/294 |
| 2010/0302426 A1 * | 12/2010 | Moini et al. | 348/308 |
| 2010/0322530 A1 * | 12/2010 | Feng et al. | 382/260 |
| 2011/0002552 A1 * | 1/2011 | Yamamoto et al. | 382/233 |

FOREIGN PATENT DOCUMENTS

| | | |
|---|---|---|
| JP | 11-284910 A | 10/1999 |
| JP | 2000-222097 A | 8/2000 |
| JP | 2006-180111 | 7/2006 |
| JP | 2009-515147 A | 4/2009 |
| WO | 2007/045108 A1 | 4/2007 |
| WO | 2009/147862 A1 | 12/2009 |

OTHER PUBLICATIONS

Japanese Notice of Allowance application No. 2010-204581 dated Jul. 16, 2013.

\* cited by examiner

*Primary Examiner* — James Hannett
*Assistant Examiner* — Akshay Trehan
(74) *Attorney, Agent, or Firm* — Squire Sanders (US) LLP

(57) ABSTRACT

An image capturing device includes a photodetector including a plurality of pixels, each having a photoelectric conversion unit outputting electric charges depending on received light, charge accumulation units accumulating the electric charges, and a drain electrode that discards the electric charges, a finite impulse response filter which is applied to images, a controller controlling the pixels so as to distribute the electric charges that are output by the photoelectric conversion units to the charge accumulation units and to the drain electrodes at a distribution ratio depending on a weight coefficient of a corresponding delay period of the finite impulse response filter at each delay period, and reading the electric charges accumulated in the charge accumulation units after a whole delay period of the finite impulse response filter elapses, and an image processor generating the images based on the electric charges that are read by the controller.

5 Claims, 9 Drawing Sheets

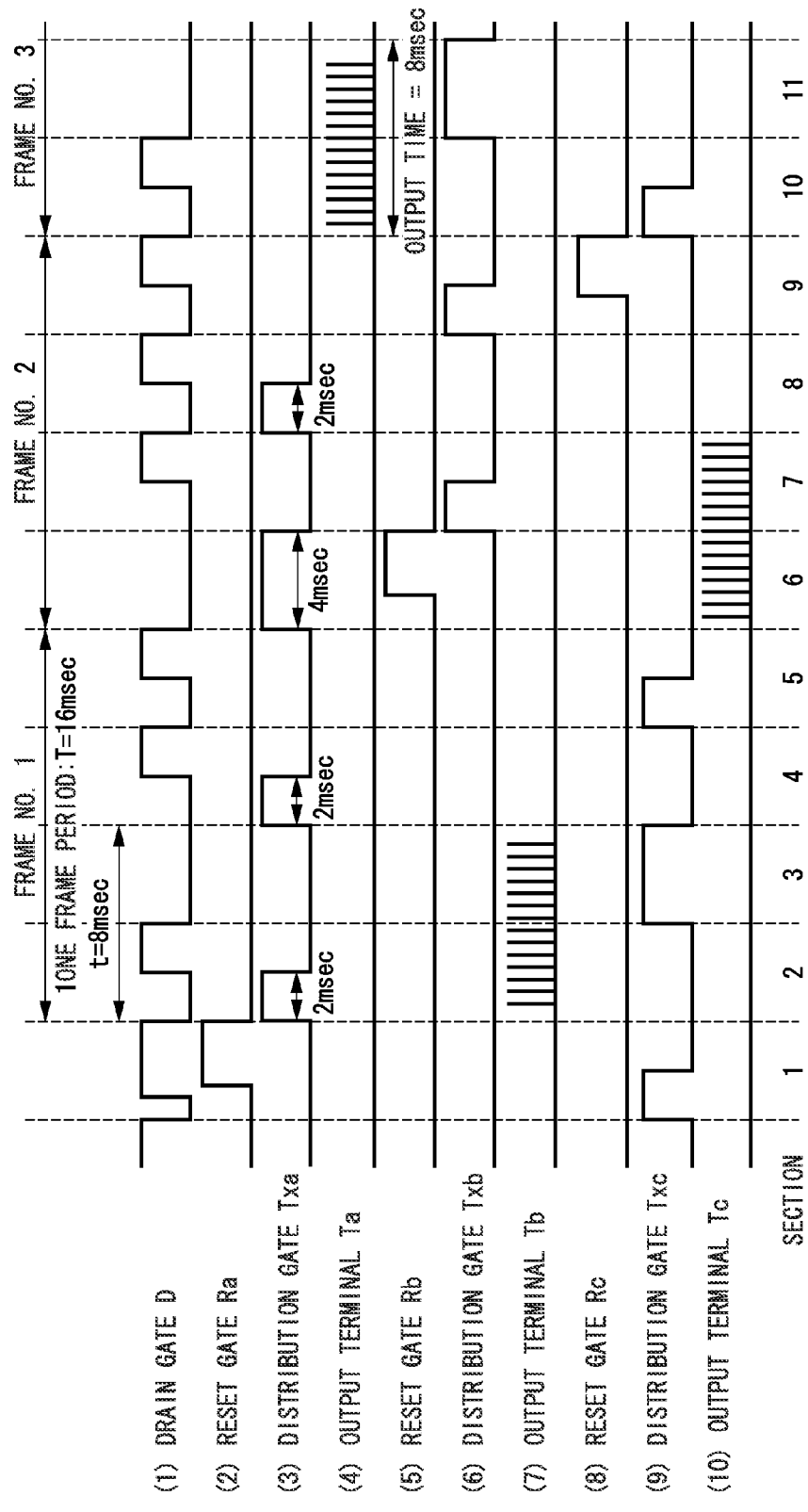

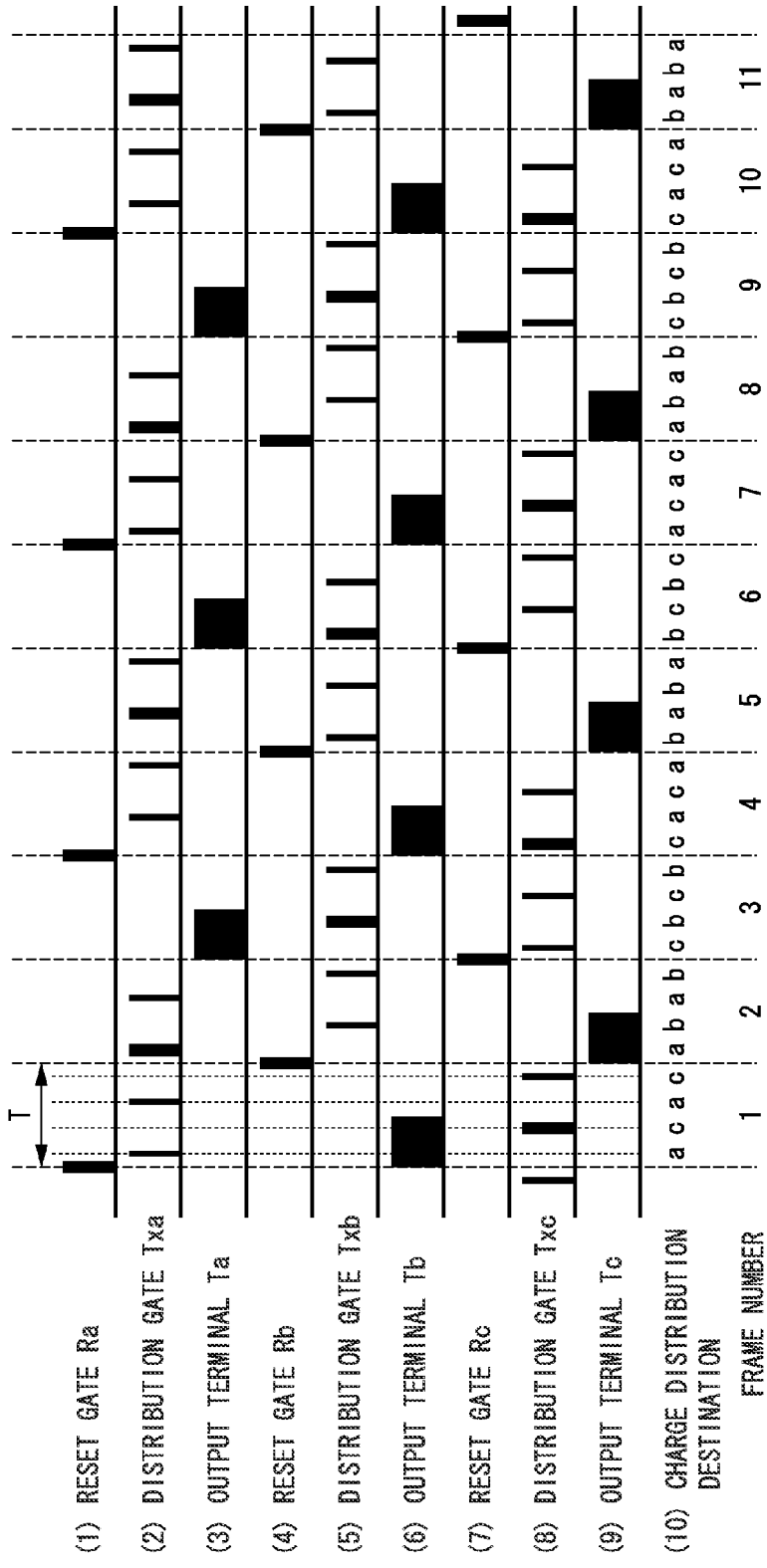

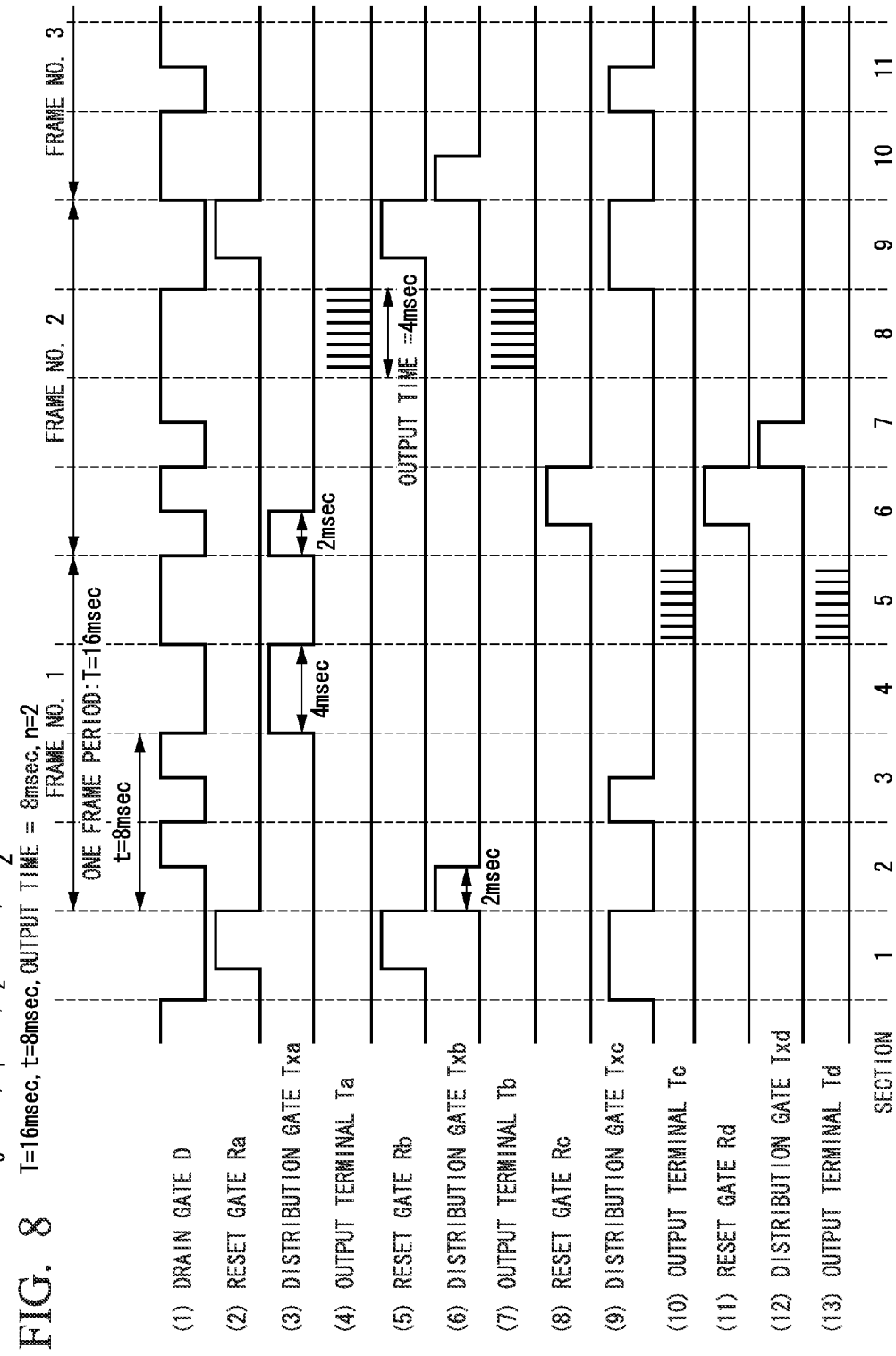

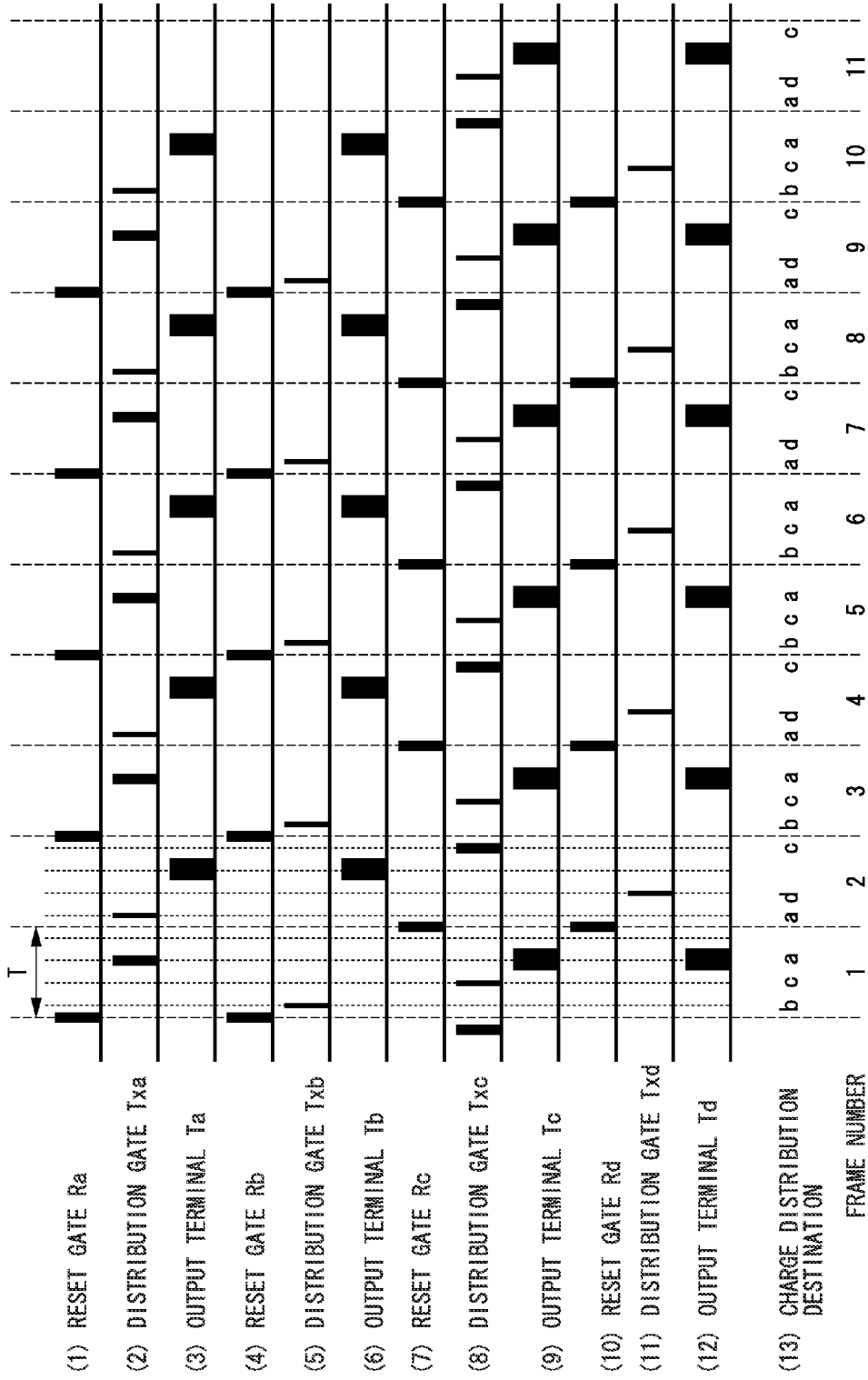

IMAGE CAPTURING DEVICE AND IMAGE CAPTURING METHOD

CROSS REFERENCE TO RELATED APPLICATIONS

This application claims priority on Japanese Patent Application No. 2010-204581, filed Sep. 13, 2010, the content of which is incorporated herein by reference.

BACKGROUND OF THE INVENTION

1. Field of the Invention

The present invention relates to an image capturing device and an image capturing method.

2. Description of Related Art

In the related art, an image capturing device that captures a moving image by controlling a charge accumulation time for each line that constitutes a frame and controlling an exposure time for each frame is known (for example, refer to JP-A-2006-180111). Furthermore, a method of applying a time series FIR (Finite Impulse Response) filter to a captured image using many images (for example, several thousand images) captured in a short time is known.

However, in the case of applying the time series FIR filter to the captured image, there is a problem in that it is necessary to capture many images in a short time before and after capturing the image. Furthermore, a capturing device that can capture the many images, which are necessary to apply the time series FIR filter to the image, in a short time, is necessary. Furthermore, since the time series FIR filter is applied using many images, the processing load is heightened, and a high-performance image processing device that can execute the above-described process is necessary.

SUMMARY OF THE INVENTION

The present invention has been made to solve the above-mentioned problems occurring in the related art, and an object of the present invention is to provide an image capturing device and an image capturing method, which can capture an image to which a time series FIR filter is applied without using many images.

According to a first aspect of the present invention, there is provided an image capturing device, which includes a photodetector including a plurality of pixels, each having a photoelectric conversion unit outputting electric charges depending on received light, charge accumulation units accumulating the electric charges, and a drain electrode that discards the electric charges; a finite impulse response filter which is applied to images; a controller controlling the pixels so as to distribute the electric charges that are output by the photoelectric conversion units to the charge accumulation units and to the drain electrodes at a distribution ratio depending on a weight coefficient of a corresponding delay period of the finite impulse response filter at each delay period, and reading the electric charges accumulated in the charge accumulation units after a whole delay period of the finite impulse response filter elapses; and an image processor generating the images based on the electric charges that are read by the controller.

According to a second aspect of the invention, the controller may control the pixels so as to distribute the electric charges that are output by the photoelectric conversion units to at least one of the charge accumulation units, respectively, depending on the images.

According to a third aspect of the invention, the controller may control the pixels so as to distribute the electric charges that are output by the photoelectric conversion units to at least one of the charge accumulation units, respectively, depending on whether the weight coefficient is a positive value or a negative value, and the image processor may generate the images based on a value which is obtained by subtracting a charge amount of the electric charges that are distributed when the weight coefficient is a negative value from a charge amount of the electric charges that are distributed when the weight coefficient is a positive value.

According to a fourth aspect of the invention, the pixel provided in the photodetector may include a drain gate outputting the electric charges that are output by the photoelectric conversion units to the drain electrodes depending on an applied voltage, and distribution gates outputting the electric charges that are output by the photoelectric conversion units to the charge accumulation units depending on the applied voltage; and the controller controlling the electric charges that are output by the photoelectric conversion units to be distributed to the charge accumulation units and to the drain electrodes by applying a voltage to the drain gate and the distribution gates.

According to a fifth aspect of the invention, there is provided an image capturing method for an image capturing device, which includes outputting, by photoelectric conversion units, electric charges depending on received light; accumulating, by charge accumulation units, the electric charges; discarding, by drain electrodes, the electric charges; performing control, by a controller, to distribute the electric charges that are output by the photoelectric conversion units to the charge accumulation units and to the drain electrodes at a distribution ratio depending on a weight coefficient of a corresponding delay period of a finite impulse response filter that is applied to images at each delay period, and reading the electric charges accumulated in the charge accumulation units after a whole delay period of the finite impulse response filter elapses; and generating, by an image processor, the images based on the electric charges that are read in the charge reading step.

According to the first aspect of the invention, the photoelectric conversion units provided in the pixels output the electric charges depending on the received light. Furthermore, the charge accumulation units provided in the pixels accumulate the electric charges. Furthermore, the drain electrodes provided in the pixels discard the electric charges. A finite impulse response filter which is applied to images is provided. Furthermore, the controller controls the pixels so as to distribute the electric charges that are output by the photoelectric conversion units to the charge accumulation units and the drain electrodes at the distribution ratio depending on the weight coefficient in the corresponding delay period of the finite impulse response filter at each delay period, and reads the electric charges accumulated in the charge accumulation units after a whole delay period of the finite impulse response filter elapses. Furthermore, the image processor generates the images based on the electric charges that are read by the controller.

Therefore, the pixels are controlled so as to distribute the electric charges that are output by the photoelectric conversion units to the charge accumulation units and the drain electrodes at the distribution ratio depending on the weight coefficient in the corresponding delay period of the finite impulse response filter at each delay period, and the images can be generated based on the electric charges that are distributed to the charge accumulation unit. Accordingly, the image to which the time series finite impulse response filter is applied can be captured without using many images.

Furthermore, according to the second aspect of the invention, the controller controls the pixels so as to distribute the electric charges that are output by the photoelectric conversion units to at least one of the charge accumulation units, respectively, depending on the images.

Therefore, since the electric charges can be distributed to the different charge accumulation units, respectively, depending on the images, plural images can be captured in parallel.

Furthermore, according to the third aspect of the invention, the controller controls the pixels so as to distribute the electric charges that are output by the photoelectric conversion units to at least one of the charge accumulation units, respectively, depending on whether the weight coefficient is a positive value or a negative value, and the image processor generates the images based on the value which is obtained by subtracting the charge amount of the electric charges that are distributed when the weight coefficient is a negative value from the charge amount of the electric charges that are distributed when the weight coefficient is a positive value.

Therefore, even when the weight coefficients of the finite impulse response filter that is applied to the image include a positive value and a negative value, the images to which the time series finite impulse response filter is applied can be captured.

Furthermore, according to the fourth aspect of the invention, the drain gate provided in the pixel outputs the electric charges that are output by the photoelectric conversion units to the drain electrodes depending on the applied voltage. Furthermore, the distribution gates provided in the pixels output the electric charges that are output by the photoelectric conversion units to the charge accumulation units depending on the applied voltage. Furthermore, the controller controls the electric charges that are output by the photoelectric conversion units to be distributed to the charge accumulation units and to the drain electrodes by applying the voltage to the drain gate and the distribution gates.

Therefore, the controller can distribute the electric charges that are output by the photoelectric conversion units to the drain electrodes and the charge accumulation units by applying the voltage to the drain gate and the distribution gates. Accordingly, the controller can distribute the electric charges that are output by the photoelectric conversion units to the drain electrodes and the charge accumulation units at high speed.

Furthermore, according to the fifth aspect of the invention, the image capturing method includes outputting, by the photoelectric conversion units, electric charges depending on received light; accumulating, by the charge accumulation units, the electric charges; discarding, by the drain electrodes, the electric charges; controlling, by the controller, to distribute the electric charges that are output by the photoelectric conversion units to the charge accumulation units and to the drain electrodes at the distribution ratio depending on the weight coefficient in the corresponding delay period of the finite impulse response filter that is applied to the images at each delay period, and reading the electric charges accumulated in the charge accumulation units after a whole delay period of the finite impulse response filter elapses; and generating, by the image processor, the images based on the electric charges that are read in the charge reading step.

Therefore, the pixels are controlled so as to distribute the electric charges that are output by the photoelectric conversion units to the charge accumulation units and the drain electrodes at the distribution ratio depending on the weight coefficient in the corresponding delay period of the finite impulse response filter at each delay period, and the images can be generated based on the electric charges that are distributed to the charge accumulation unit. Accordingly, the image to which the time series finite impulse response filter is applied can be captured without using many images.

BRIEF DESCRIPTION OF THE DRAWINGS

FIG. 6 is a timing diagram illustrating an example of the operation timing of a drain gate, reset gates, distribution gates, and output terminals of charge accumulation units according to this embodiment of the invention;

FIG. 7 is a timing diagram illustrating the operation timing of a reset gate, distribution gates, and output terminals of charge accumulation units according to this embodiment of the invention;

FIG. 8 is a timing diagram illustrating an example of the operation timing of a drain gate, reset gates, distribution gates, and output terminals of charge accumulation units according to this embodiment of the invention; and FIG. 9 is a timing diagram illustrating the operation timing of reset gates, distribution gates, and output terminals of charge accumulation units according to this embodiment of the invention.

DETAILED DESCRIPTION OF THE INVENTION

Figure 1:
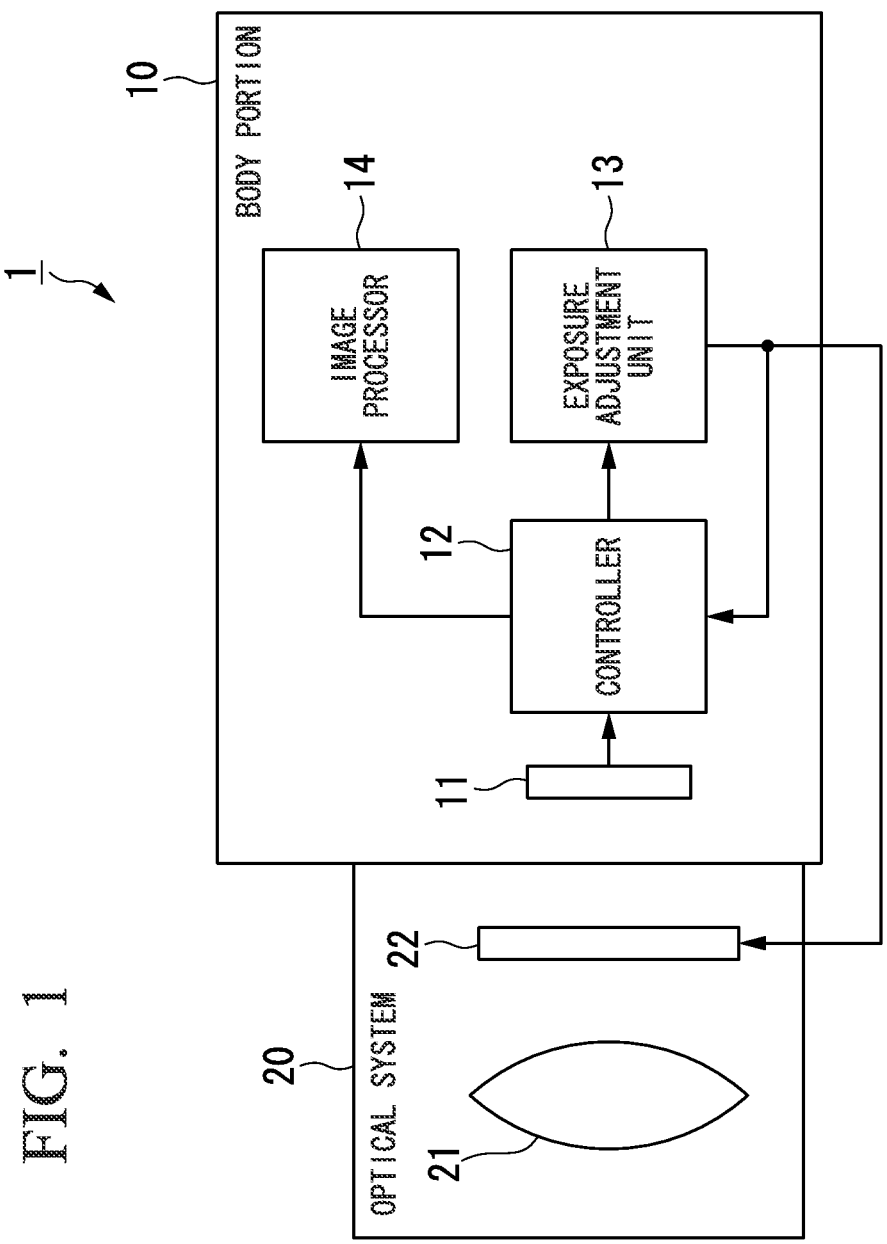
FIG. 1 is a block diagram illustrating the configuration of an image capturing device according to an embodiment of the invention.

Hereinafter, an embodiment of the invention will be described. FIG. 1 is a block diagram illustrating the configuration of an image capturing device 1 according to an embodiment of the invention. In the illustrated embodiment, the image capturing device 1 includes a body portion 10 and an optical system 20. The body portion 10 includes a photodetector 11, a controller 12, an exposure adjuster 13, and an image processor 14. The optical system 20 includes a lens 21 and an iris 22. In this case, the optical system 20 is detachably provided on the body portion 10.

The optical system 20 projects an object image on an image capturing surface of the photodetector 11. Furthermore, the optical system 20 focuses on an object by moving a lens 21 according to a focus adjustment instruction that is input from the controller 12. Furthermore, the optical system 20 adjusts an iris 22 according to an iris adjustment instruction that is input from the exposure adjuster 13.

The photodetector 11 has a structure in which a plurality of pixels are two-dimensionally arranged, and generates and accumulates electric charges according to the object image (received light) that is projected on the image capturing surface. The structure of a pixel provided in the photodetector 11 will be described later.

The controller 12 realizes a time-axis FIR (Finite Impulse Response) filter through the control of the photodetector 11. A method of realizing the time-axis FIR filter will be described later. Furthermore, the controller 12 reads the electric charges accumulated by the photodetector 11 through the control of the photodetector 11. The exposure adjuster 13 specifies the iris state of the iris 22 based on the image capturing conditions. The image processor 14 generates an image based on the electric charges s that are read by the controller 12.

Figure 2:
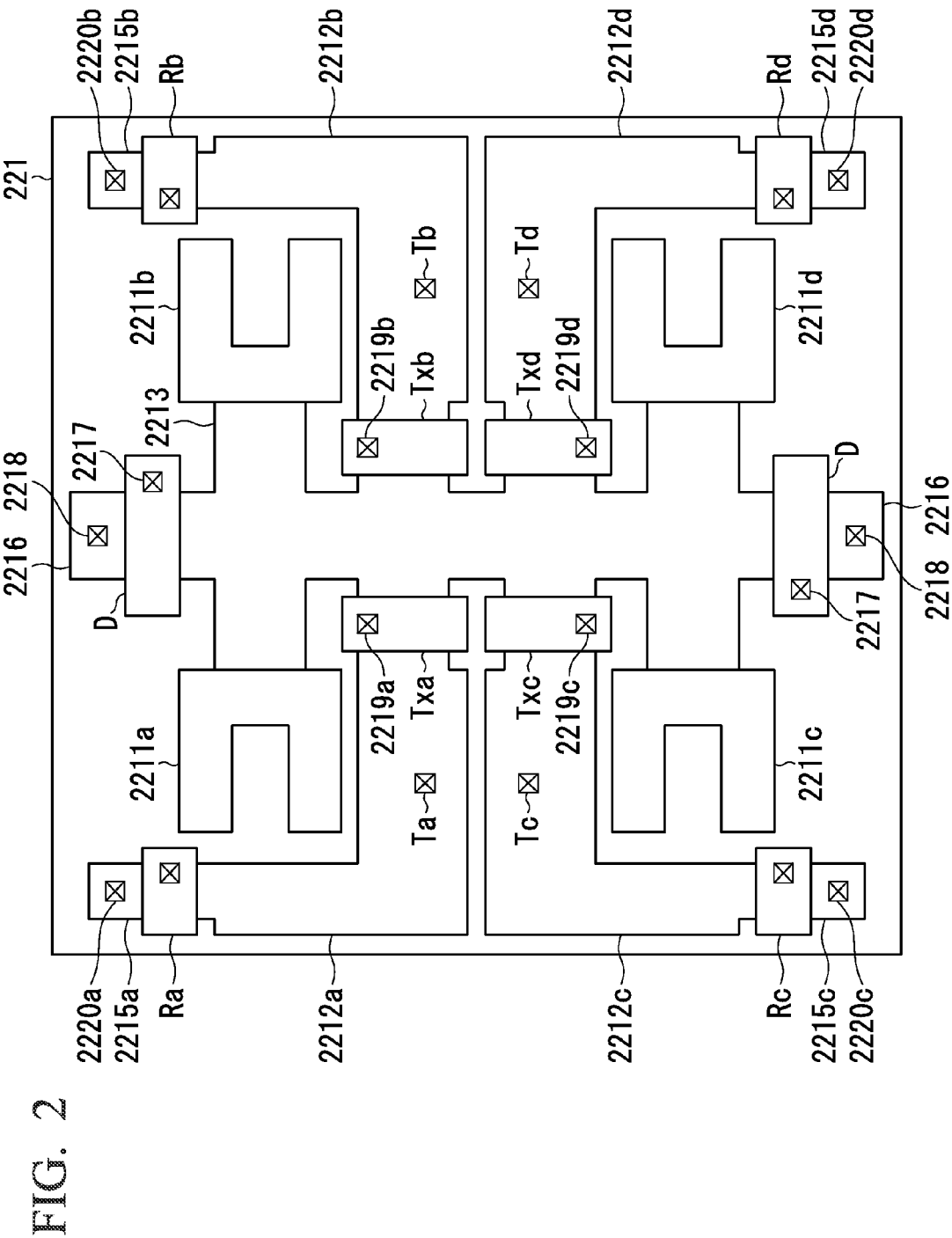
FIG. 2 is a diagram illustrating the configuration of a pixel that is provided in a photodetector according to this embodiment of the invention.

Next, the configuration of a pixel 221 that is provided in the photodetector 11 will be described. FIG. 2 is a diagram illustrating the configuration of a pixel that is provided in a photodetector according to this embodiment of the invention. The pixel 221 includes four photoelectric conversion units 2211a to 2211d, a charge transmission unit 2213, a drain gate D, a drain electrode 2216, four charge accumulation units 2212a to 2212d, distribution gates Txa to Txd distributing the respective charge accumulation units 2212a to 2212d, reset gates Ra to Rd, and reset electrodes 2215a to 2215d.

The photoelectric conversion units 2211a to 2211d are connected to the charge transmission unit 2213. Furthermore, the charge transmission unit 2213 is connected to the drain electrode 2216 through the drain gate D. Furthermore, the charge transmission unit 2213 is connected to the charge accumulation units 2212a to 2212d through the distribution gates Txa to Txd. Furthermore, the charge accumulation units 2212a to 2212d are connected to the reset electrodes 2215a to 2215d through the reset gates Ra to Rd.

Furthermore, the drain gate D is provided with a drain gate control terminal 2217. Furthermore, the drain electrode 2216 is provided with a drain electrode output terminal 2218. Furthermore, the distribution gates Txa to Txd are provided with distribution gate control terminals 2219a to 2219d. Furthermore, the charge accumulation units 2212a to 1121d are provided with charge accumulation unit output terminals Ta to Td. Furthermore, the reset gates Ra to Rd are provided with reset gate control terminals 2214a to 2214d. Furthermore, the reset electrodes 2215a to 2215b are provided with reset electrode output terminals 2220a to 2220d.

The photoelectric conversion units 2211a to 2211d generate electric charges depending on an exposure amount, and output the generated electric charges to the charge transmission unit 2213. The charge transmission unit 2213 outputs the electric charges that are input from the photoelectric conversion units 2211a to 2211d to the drain electrode 2216 or the charge accumulation units 2212a to 2212d. The controller 12 may control the destination to which the charge transmission unit 2213 outputs the electric charges by controlling the drain gate D and the distribution gates Txa to Txd.

Specifically, the controller 12 may control the charge transmission unit 2213 to output the electric charges to the drain electrode 2216 by controlling the drain gate D and the distribution gates Txa to Txd so that the drain gate D passes the electric charges (opens the gate) and the distribution gates Txa to Txd do not pass the electric charges (shut the gate). Furthermore, the controller 12 may control the charge transmission unit 2213 to output the electric charges to the charge accumulation unit 2212a by controlling the drain gate D and the distribution gates Txa to Txd so that the distribution gate Txa passes the electric charges and the drain gate D and the distribution gates Txa to Txd do not pass the electric charges. Furthermore, the controller 12 may control the charge transmission unit 2213 to output the electric charges to the charge accumulation unit 2212b by controlling the drain gate D and the distribution gates Txa to Txd so that the distribution gate Txb passes the electric charges and the drain gate D and the distribution gates Txa, Txc, and Txd do not pass the electric charges. Furthermore, the controller 12 may control the charge transmission unit 2213 to output the electric charges to the charge accumulation unit 2212c by controlling the drain gate D and the distribution gates Txa to Txd so that the distribution gate Txc passes the electric charges and the drain gate D and the distribution gates Txa, Txb, and Txd do not pass the electric charges. Furthermore, the controller 12 may control the charge transmission unit 2213 to output the electric charges to the charge accumulation unit 2212d by controlling the drain gate D and the distribution gates Txa to Txd so that the distribution gate Txd passes the electric charges and the drain gate D and the distribution gates Txa to Txc do not pass the electric charges.

For example, the drain gate D and the distribution gates Txa to Txd are configured (field-effect transistor (FET)) to pass the electric charges (to open the gate) when a voltage is applied from an outside. In this case, the controller 12 may control the drain gate D to pass the electric charges by applying the voltage to the drain gate D through the drain gate control terminal 2217. In the same manner, the controller 12 may control the distribution gates Txa to Txd to pass the electric charges by applying the voltage to the distribution gates Txa to Txd through the distribution gate control terminals 2219a to 2219d.

In this case, the drain gate D and the distribution gates Txa to Txd can perform opening and closing of the gate at high speed. Accordingly, the controller 12 can operate to distribute the electric charges that are output by the photoelectric conversion units 2211a to 221d to any one of the drain electrode 2216 and the charge accumulation units 2212a to 2212d.

The drain electrode 2216 outputs the electric charges that are input from the charge transmission unit 2213 to the controller 12 through the drain electrode output terminal 2218. The controller 12 outputs (discards) the electric charges input from the drain electrode 2216 to the outside.

The charge accumulation units 2212a to 2212d accumulate the electric charges input from the charge transmission unit 2213. The controller 12 reads the electric charges accumulated in the charge accumulation units 2212a to 2212d through the charge accumulation unit output terminal Ta to Td in a predetermined timing. Furthermore, the charge accumulation units 2212a to 2212d output the accumulated electric charges to the reset electrodes 2215a to 2215d while the reset gates Ra to Rd pass the electric charges (open the gate).

For example, the reset gates Ra to Rd have the same configuration as that of the drain gate D and the distribution gates Txa to Txd, and if a voltage is applied from the outside, they pass the electric charges. In this case, the controller 12 may operate to open the reset gates Ra to Rd by applying the voltage to the reset gates Ra to Rd through the reset gate control terminals 2214a to 2214d. Accordingly, the controller 12 may operate to output the electric charges accumulated in the charge accumulation units 2212a to 2212d to the reset electrodes 2215a to 2215d.

The reset electrodes 2215a to 2215d output (discard) the electric charges input from the charge accumulation units 2212a to 2212d to the outside through the reset electrode output terminals 2220a to 2220d.

By the above-described configuration, the controller 12 can operate to output and discard the electric charges on the drain electrode D depending on the exposure amount that is output by the charge accumulation units 2212a to 2212d, or to output and accumulate the electric charges to any one of the charge accumulation units 2212a to 2212d. That is, the charge distribution can be performed.

Figure 3:
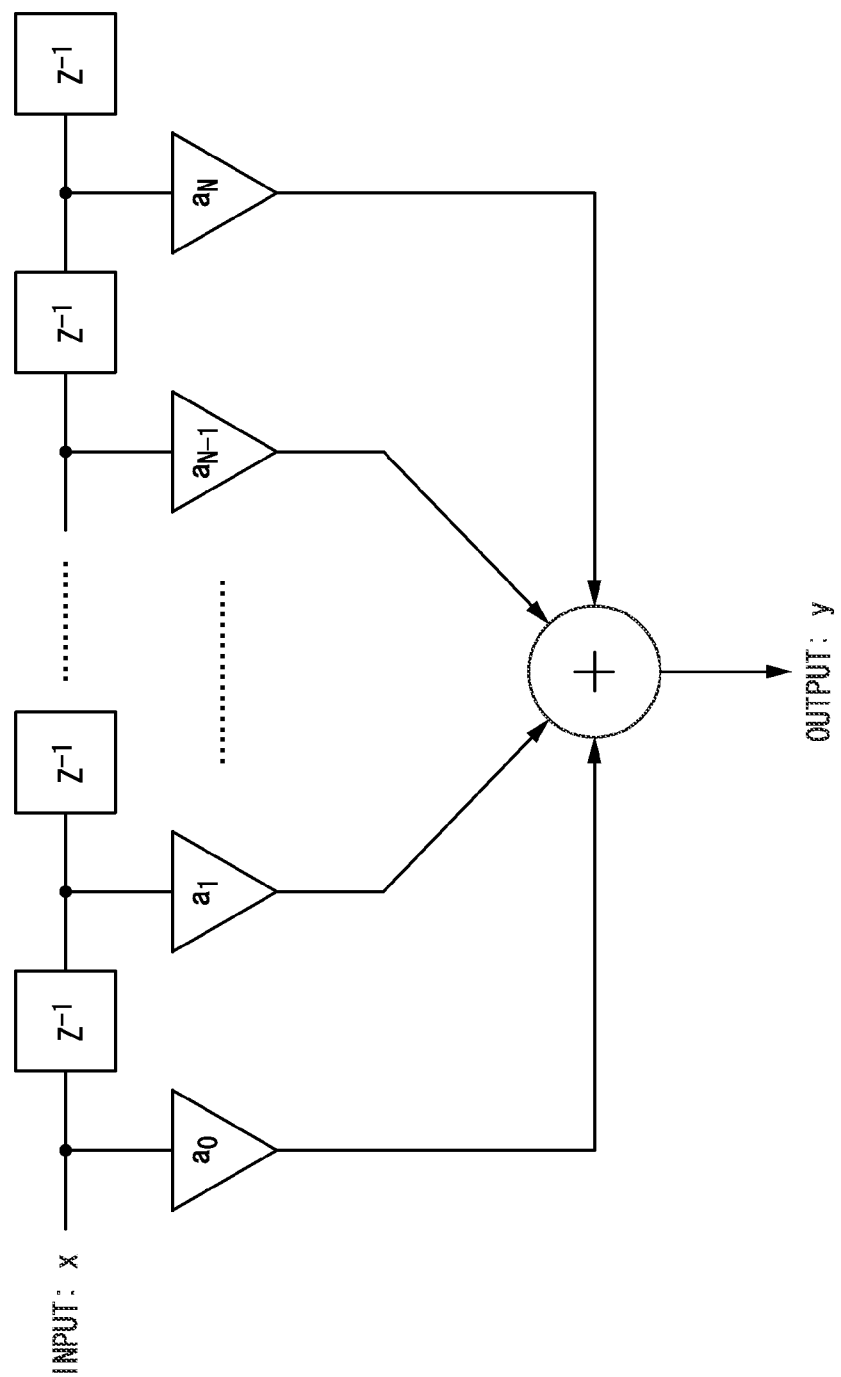
FIG. 3 is a schematic diagram illustrating the configuration of a FIR filter.

Next, the FIR (Finite Impulse Response) filter will be described. FIG. 3 is a schematic diagram illustrating the configuration of the FIR filter.

The FIR filter expresses an output value y against an input value x as in Equation (1) using a coefficient $a_i$ (weight coefficient) and a degree N. In this case, the value of the coefficient $a_i$ is determined according to the characteristic of the FIR filter.

For example, as a method for determining the coefficient a method that has been used to design the FIR filter in the related art.

$$y_n = \sum_{i=0}^{N} a_i x_{n-1} \qquad (1)$$

In this embodiment, the time-axis FIR filter is realized by accumulating the electric charges generated by the photoelectric conversion units 2212a to 2211d as much as the percentage amount depending on the coefficient $a_i$ for each delay time t (delay period of the FIR filter) caused by the FIR filter z through distribution of the electric charges.

For example, if all the coefficients $a_i$ are positive ($0 <= a_i <= 1$) or negative ($-1 <= a_i <= 0$), the FIR filter can be approximately realized by distributing to the charge accumulation units 2212a to 2212d the electric charges generated by the photoelectric conversion that is performed by the photoelectric conversion units 2211a to 2211d as much as the percentage amount depending on the coefficient $a_i$ for each delay time t caused by the FIR filter z through control of the drain gate D and the distribution gates Txa to Txd.

Furthermore, if the coefficients $a_i$ take both the positive and negative values, the coefficients $a_i$ are divided into a positive term and a negative term, and are distributed to the charge accumulation units 2212a to 2212d that integrate only terms in which $a_i$ is positive and to the charge accumulation units 2212a to 2212d that integrate only terms in which $a_i$ is negative, respectively. Furthermore, by subtracting the value of the electric charges accumulated in the charge accumulation units 2212a to 2212d that integrate only the terms in which $a_i$ is negative from the value of the electric charges accumulated in the charge accumulation units 2212a to 2212d that integrate only the terms in which $a_i$ is positive, the FIR filter can be approximately realized even when $a_i$ takes both positive and negative values.

If the relationship between the delay time t caused by the FIR filter z and the time T for acquiring an image of one frame is T>tN, distribution to two places is performed, while if the relationship is T<tN<2T, at least four overlapping distribution is necessary. In this case, the "overlapping" means that the distributed electric charges are used in plural frames in order to generates an image of one frame.

Then, a method of accumulating the electric charges in the charge accumulation units 2212a to 2212d (a method of realizing coefficients a) as much as the percentage amount depending on coefficients $a_i$ (the ratio that corresponds to the weight coefficient) will be described. Hereinafter, two realizing methods will be described.

(Method 1 of Realizing Coefficients $a_i$)

Figure 4:
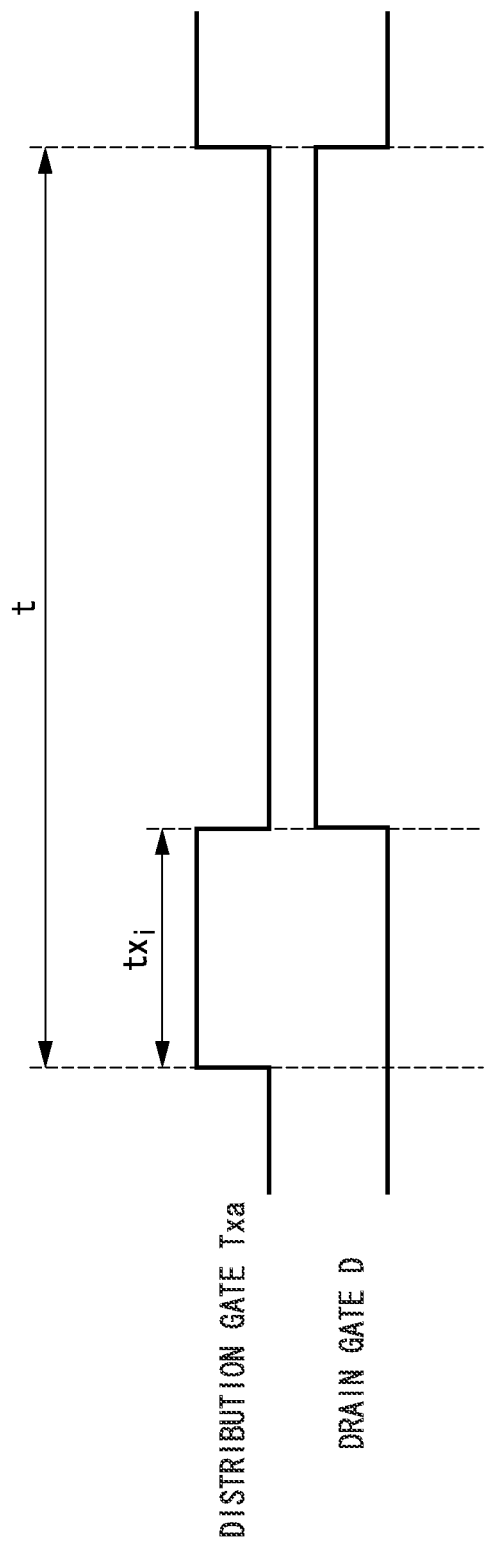
FIG. 4 is a timing diagram illustrating the timing in which a distribution gate and a drain gate pass electric charges according to this embodiment of the invention.

The method 1 of realizing coefficients $a_i$ is a method in which the distribution time $tx_i$ of the electric charges is changed depending on the magnitude of the coefficients $a_i$ without changing the distribution frequency of the electric charges. FIG. 4 is a timing diagram illustrating the timing in which the distribution gate Txa and the drain gate D pass electric charges when the coefficients $a_i$ are realized through the change of the distribution time $tx_i$. In this case, "t" represents the delay time caused by the FIR filter z. Furthermore, "$tx_i$" represents the time in which the distribution gate Txa passes the electric charges.

The illustrated example is an example where the electric charges are accumulated in the charge accumulation unit 2212a. In this example, during the delay time t caused by the FIR filter z, the distribution gate Txa passes the electric charges for time $tx_i$, and the drain gate D passes the electric charges for other times. That is, during the delay time t caused by the FIR filter z, the charge accumulation unit 2212a accumulates the electric charges for the time $tx_i$, while in other times, the electric charges are discharged.

In the method of changing the distribution time $tx_i$ of the electric charges without changing the distribution frequency of the electric charges, the relationship between the coefficient $a_i$ and the distribution time $tx_i$ may be represented by Equation (2).

$$a_i = k \frac{tx_i \cdot n}{t} \qquad (2)$$

In this case, n represents the number of overlaps, which is the number of frames that distribute the electric charges, used when an image of one frame is generated. For example, the number of overlaps in the case of using the electric charges that are distributed for two frames when the image of one frame is generated is 2. Furthermore, a proportional constant k is determined based on the relationship between the maximum value of the distribution time $tx_i$ and the delay time t caused by the FIR filter z. Specifically, the coefficient $a_i$ that gives a maximum absolute value is defined as $a_{max}$. Furthermore, since $tx_i \times n$ is always equal to or larger than t, $(tx_i \times n)/t$ is equal to or smaller than 1. Accordingly, the proportional constant k may be expressed as $k=|a_{max}|$.

Furthermore, when the coefficients $a_i$ take both the positive and negative values, the coefficients $a_i$ may be divided into coefficients $k^+$ when the coefficients $a_i$ have a positive value and coefficients $k^-$ when the coefficients $a_i$ have a negative value. In this case, if the maximum value when the coefficients $a_i$ have a positive value is $a_{max}$, the proportional constant may become $k^+=a_{max}$. In the same manner, if the minimum value when the coefficients $a_i$ have a negative value is $a_{min}$, the proportional constant may become $k^-=a_{min}$.

Based on the relationship in the above-described Equation (2), the distribution time $tx_i$ of the electric charges is determined depending on the magnitude of the coefficients the electric charges are accumulated in the charge accumulation units 2212a to 2212d for the time $tx_i$, and during the rest time, the electric charges are discharged, and thus the electric charges depending on the coefficients $a_i$ may be accumulated in the charge accumulation units 2212a to 2212d.

(Method 2 of Realizing Coefficients $a_i$)

Figure 5:
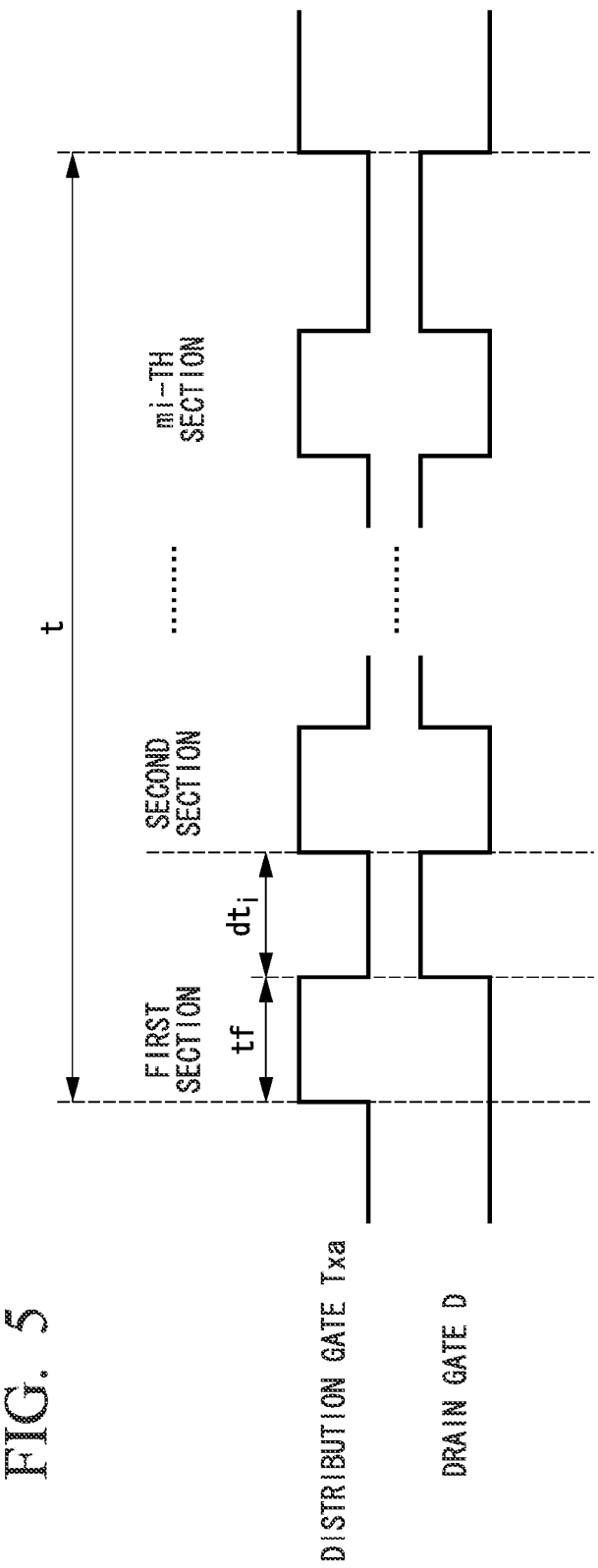
FIG. 5 is a timing diagram illustrating the timing in which a distribution gate and a drain gate pass electric charges according to this embodiment of the invention.

The method 2 of realizing coefficients $a_i$ is a method in which the distribution frequency $m_i$ of the electric charges is changed depending on the magnitude of the coefficients $a_i$ without changing the charge accumulation time in a charge distribution period. FIG. 5 is a timing diagram illustrating the timing in which the distribution gate Txa and the drain gate D pass the electric charges when the coefficients $a_i$ are realized through the change of the distribution frequency $m_i$. In this case, "t" represents the delay time caused by the FIR filter z. Furthermore, "$m_i$" represents the frequency in which the distribution gate Txa distributes the electric charges. Furthermore, it is assumed that in t a charge distribution period, a charge accumulating time is "tf". Furthermore, it is assumed that in a charge distribution period, the charge discharging time is dti. In this case, "tf" is a sufficiently short period, which is equal to or smaller than a few tenths of t.

The illustrated example is an example where the electric charges are accumulated in the charge accumulation unit 2212a. In this example, during the delay time t caused by the FIR filter z, the charge distribution is performed $m_i$ times. That is, during the delay time t caused by the FIR filter z, the electric charges are accumulated in the charge accumulation unit 2212a for the time tf×$m_i$, while in other times, the electric charges are discharged.

In the method of changing the distribution frequency $m_i$ of the electric charges without changing the distribution time of the electric charges, the relationship between the coefficient $a_i$ and the distribution frequency $m_i$ may be represented by Equation (3). Furthermore, in a charge distribution period, the relationship between the charge discharging time dti and the distribution frequency $m_i$ may be represented by Equation (4).

$$a_i = k \frac{tf \cdot m_i \cdot n}{t} \quad (3)$$

$$dt_i = \frac{t - tf \cdot m_i \cdot n}{m_i} \quad (4)$$

In this case, n represents the number of overlaps. Furthermore, the proportional constant k is determined based on the relationship between the maximum value of the distribution frequency $m_i$ and (tf/t). Specifically, the coefficient $a_i$ that gives a maximum absolute value is defined as $a_{max}$. Furthermore, since tf×$m_i$×n is always equal to or smaller than t, (tf×$m_i$×n)/t is equal to or smaller than 1. Accordingly, the proportional constant k may be expressed as k=|$a_{max}$|.

Furthermore, when the coefficients $a_i$ take both the positive and negative values, the coefficients $a_i$ may be divided into coefficients $k^+$ when the coefficients $a_i$ have a positive value and coefficients $k^-$ when the coefficients $a_i$ have a negative value. In this case, if the maximum value when the coefficients $a_i$ have a positive value is $a_{max}$, the proportional constant may become $k^+=a_{max}$. In the same manner, if the minimum value when the coefficients $a_i$ have a negative value is $a_{min}$, the proportional constant may become $k^+=a_{max}$. In the same manner, if the minimum value when the coefficients $a_i$ have a negative value is $a_{min}$, the proportional constant may become $k^-=a_{min}$.

The electric charges depending on the coefficients $a_i$ can be accumulated in the charge accumulation units 2212a to 2212d by determining the distribution frequency $m_i$ of the electric charges and the charge discharging time dti in a charge distribution period depending on the magnitude of the coefficients $a_i$ based on the relationship in the above-described Equations (3) and (4), and by distributing the electric charges to the charge accumulation units 2212a to 2212d for a period defined by multiplying the distribution frequency $m_i$ and the charge accumulation time tf in a charge distribution period.

Next, a method of realizing the FIR filter will be described. Hereinafter, a case where all the coefficients $a_i$ take positive values and a case where the coefficients $a_i$ take positive and negative values will be described.

(When all the Coefficients $a_i$ Take Positive Values)

FIG. 6 is a timing diagram illustrating an example of the operation timing of the drain gate D, the reset gates Ra, Rb, and Rc, the distribution gates Txa, Txb, and Txc, and the output terminals Ta, Tb, and Tc of the charge accumulation units when all the coefficients $a_i$ take positive values. In this case, the illustrated timing chart represents the operation timing up to a middle point of the frame no. 3.

In the illustrated example, the coefficient $a_0$ is 0.25, the coefficient $a_1$ is 0.5, the coefficient $a_2$ is 0.25, the coefficient $a_3$ is 0.25, the proportional constant k is ½, the frame period T is 16 msec, the delay time t caused by the FIR filter z is 8 msec, the output time is 8 msec, and the number of overlaps n is 2. Furthermore, the horizontal axis of the illustrated timing chart represents time, and sections 1 to 11 are provided in time series order. Furthermore, the time that indicates one section is 4 msec. In this case, four sections are included in a frame period T.

Part (1) of FIG. 6 shows the timing in which the drain gate D passes the electric charges. Part (2) of FIG. 6 shows the timing in which the reset gate Ra passes the electric charges. Part (3) of FIG. 6 shows the timing in which the distribution gate Txa passes the electric charges. Part (4) of FIG. 6 shows the timing in which the output terminal Ta outputs the electric charges. Part (5) of FIG. 6 shows the timing in which the reset gate Rb passes the electric charges. Part (6) of FIG. 6 shows the timing in which the distribution gate Txb passes the electric charges. Part (7) of FIG. 6 shows the timing in which the output terminal Tb outputs the electric charges. Part (8) of FIG. 6 shows the timing in which the reset gate Rc passes the electric charges. Part (9) of FIG. 6 shows the timing in which the distribution gate Txc passes the electric charges. Part (10) of FIG. 6 shows the timing in which the output terminal Tc outputs the electric charges.

In the illustrated example, the electric charges that are output by the photoelectric conversion units 2211a to 2211d is distributed to three charge accumulation units 2212a to 2212c. Furthermore, the one frame image is generated using the electric charges accumulated in the charge accumulation unit 2212a, one frame image is generated using the electric charges accumulated in the charge accumulation unit 2212b, and one frame image is generated using the electric charges accumulated in the charge accumulation unit 2212c.

Hereinafter, a process of generating one frame image using the electric charges accumulated in the charge accumulation unit 2212a will be described. In section 2, in order to realize the coefficient $a_3$=0.25, the controller 12 distributes the electric charges to the charge accumulation unit 2212a during the time $tx_3$=2 msec that is calculated in Equation (2). Furthermore, in section 4, in order to realize the coefficient $a_2$=0.25, the controller 12 distributes the electric charges to the charge accumulation unit 2212a during the time $tx_2$=2 msec that is calculated in Equation (2). Furthermore, in section 6, in order to realize the coefficient $a_1$=0.5, the controller 12 distributes the electric charges to the charge accumulation unit 2212a during the time $tx_1$=4 msec that is calculated in Equation (2). Furthermore, in section 8, in order to realize the coefficient $a_0$=0.25, the controller 12 distributes the electric charges to the charge accumulation unit 2212a during the time $tx_0$=2 msec that is calculated in Equation (2). Furthermore, in sections 2, 4, 6, and 8, the controller 12 outputs the electric charges accumulated in the charge accumulation unit 2212a to the output terminal Ta in section 10 and section 11. Accordingly, the image processor 14 can generate an image of one frame based on the electric charges that are output by the output terminal Ta.

The same charge distribution is performed with respect to the charge accumulation units 2212b and 2212c to generate a frame image.

In the illustrated example, the frame image is generated by outputting the accumulated electric charges in the order of the charge accumulation unit 2212a, the charge accumulation unit 2212b, and the charge accumulation unit 2212c. FIG. 7 is a timing diagram illustrating the operation timing of the reset gates Ra, Rb, and Rc, the distribution gates Txa, Txb, and Txc, and the output terminals Ta, Tb, and Tc of the charge accumulation units under the same conditions as that illustrated in FIG. 6. In this case, the illustrated timing chart shows the operation timing from frame no. 1 to frame no. 11. Furthermore, the horizontal axis of the illustrated timing chart represents time, and frame nos. 1 to 11 are provided in time series order. Furthermore, the frame period T is 16 msec, and four sections are included in a frame period T.

Part (1) of FIG. 7 shows the timing in which the reset gate Ra passes the electric charges. Part (2) of FIG. 7 shows the timing in which the distribution gate Txa passes the electric charges. Part (3) of FIG. 7 shows the timing in which the output terminal Ta outputs the electric charges. Part (4) of FIG. 7 shows the timing in which the reset gate Rb passes the electric charges. Part (5) of FIG. 7 shows the timing in which the distribution gate Txb passes the electric charges. Part (6) of FIG. 7 shows the timing in which the output terminal Tb outputs the electric charges. Part (7) of FIG. 7 shows the timing in which the reset gate Rc passes the electric charges. Part (8) of FIG. 7 shows the timing in which the distribution gate Txc passes the electric charges. Part (9) of FIG. 7 shows the timing in which the output terminal Tc outputs the electric charges.

The part (10) of FIG. 7, in the respective sections, shows the charge accumulation units $2212a$ to $2212c$ of the destination that distributes the electric charges. In this case, "a" indicates that the charge accumulation unit of the destination that distributes the electric charges is the charge accumulation unit $2212a$, "b" indicates that the charge accumulation unit of the destination that distributes the electric charges is the charge accumulation unit $2212b$, and "c" indicates that the charge accumulation unit of the destination that distributes the electric charges is the charge accumulation unit $2212c$.

As illustrated, the controller 12 distributes the electric charges to the charge accumulation unit $2212a$ in the first section and the third section of the frame no. 1 and in the first section and the third section of the frame no. 2, and outputs the electric charges to the charge accumulation unit $2212a$ in the first section and the second section of the frame no. 3. Then, the image processor 14 generates a frame image based on the output electric charges. Furthermore, the controller 12 distributes the electric charges to the charge accumulation unit $2212b$ in the second section and the fourth section of the frame no. 2 and in the second section and the fourth section of the frame no. 3, and outputs the electric charges to the charge accumulation unit $2212b$ in the first section and the second section of the frame no. 4. Then, the image processor 14 generates a frame image based on the output electric charges. Furthermore, the controller 12 distributes the electric charges to the charge accumulation unit $2212c$ in the first section and the third section of the frame no. 3 and in the first section and the third section of the frame no. 4, and outputs the electric charges to the charge accumulation unit $2212c$ in the first section and the second section of the frame no. 5. Then, the image processor 14 generates a frame image based on the output electric charges. Furthermore, the controller 12 distributes the electric charges to the charge accumulation unit $2212a$ in the second section and the fourth section of the frame no. 4 and in the second section and the fourth section of the frame no. 5, and outputs the electric charges to the charge accumulation unit $2212a$ in the first section and the second section of the frame no. 6. Then, the image processor 14 generates a frame image based on the output electric charges. The operation timing in the subsequent frame numbers is as illustrated in the drawing.

By this operation, the image capturing device 1 can generate a frame image to which the FIR filter is applied for each frame period T.

(When the Coefficients $a_i$ Take Both the Positive and Negative Values)

FIG. 8 is a timing diagram illustrating an example of the operation timing of the drain gate D, the reset gates Ra, Rb, Rc, and Rd, the distribution gates Txa, Txb, Txc, and Txd, and the output terminals Ta, Tb, Tc, and Td of the charge accumulation units when the coefficients $a_i$ take both the positive and negative values. In this case, the illustrated timing chart represents the operation timing up to a middle point of the frame no. 3.

In the illustrated example, the coefficient $a_0$ is 0.25, the coefficient $a_1$ is 0.5, the coefficient $a_2$ is −0.25, the proportional constant k is ½, the frame period T is 16 msec, the delay time t caused by the FIR filter z is 8 msec, the output time is 4 msec, and the number of overlaps n is 2. Furthermore, the horizontal axis of the illustrated timing chart represents time, and sections 1 to 11 are provided in time series order. Furthermore, the time that indicates one section is 4 msec. In this case, four sections are included in a frame period T.

Part (1) of FIG. 8 shows the timing in which the drain gate D passes the electric charges. Part (2) of FIG. 8 shows the timing in which the reset gate Ra passes the electric charges. Part (3) of FIG. 8 shows the timing in which the distribution gate Txa passes the electric charges. Part (4) of FIG. 8 shows the timing in which the output terminal Ta outputs the electric charges. Part (5) of FIG. 8 shows the timing in which the reset gate Rb passes the electric charges. Part (6) of FIG. 8 shows the timing in which the distribution gate Txb passes the electric charges. Part (7) of FIG. 8 shows the timing in which the output terminal Tb outputs the electric charges. Part (8) of FIG. 8 shows the timing in which the reset gate Rc passes the electric charges. Part (9) of FIG. 8 shows the timing in which the distribution gate Txc passes the electric charges. Part (10) of FIG. 8 shows the timing in which the output terminal Tc outputs the electric charges. Part (11) of FIG. 8 shows the timing in which the reset gate Rd passes the electric charges. Part (12) of FIG. 8 shows the timing in which the distribution gate Txd passes the electric charges. Part (13) of FIG. 8 shows the timing in which the output terminal Td outputs the electric charges.

In the illustrated example, the electric charges that are output by the photoelectric conversion units $2211a$ to $2211d$ is distributed to four charge accumulation units $2212a$ to $2212d$. Furthermore, the one frame image is generated using the electric charges accumulated in the charge accumulation unit $2212a$ and the charge accumulation unit $2212b$, and one frame image is generated using the electric charges accumulated in the charge accumulation unit $2212c$ and the charge accumulation unit $2212d$.

Hereinafter, a process of generating one frame image using the electric charges accumulated in the charge accumulation unit $2212a$ and the charge accumulation unit $2212b$ will be described. In this embodiment, in the case of realizing the coefficient $a_i$ having a positive value, the electric charges output by the photoelectric conversion units $2211a$ to $2211d$ is accumulated in the charge accumulation unit $2212a$, and in the case of realizing the coefficient $a_i$ having a negative value, the electric charges output by the photoelectric conversion units $2211a$ to $2211d$ is accumulated in the charge accumulation unit $2212b$. Furthermore, one frame image is generated by subtracting the value of the electric charges accumulated in the charge accumulation unit $2212b$ from the value of the electric charges accumulated in the charge accumulation unit $2212a$.

In second 2, in order to realize $a_2=-0.25$, the controller 12 distributes the electric charges to the charge accumulation unit 2212b during the time $tx_3=2$ msec that is calculated in Equation (2). Furthermore, in section 4, in order to realize the coefficient $a_2=0.5$, the controller 12 distributes the electric charges to the charge accumulation unit 2212a during the time $tx_2=4$ msec that is calculated in Equation (2). Furthermore, in section 6, in order to realize the coefficient $a_0=0.25$, the controller 12 distributes the electric charges to the charge accumulation unit 2212a during the time $tx_0=2$ msec that is calculated in Equation (2). Furthermore, in section 2, the controller 12 outputs the electric charges accumulated in the charge accumulation unit 2212b to the output terminal Tb in sections 10 and 11. Furthermore, in sections 4 and 6, the controller outputs the electric charges accumulated in the charge accumulation unit 2212a to the output terminal Ta in section 10 and section 11. Furthermore, the image processor 14 can generate an image of one frame based on the value that is obtained by subtracting the output value of the output terminal Tb from the output value of the output terminal Ta.

The same charge distribution is performed with respect to the charge accumulation units 2212c and 2212d, and one frame image is generated using the electric charges accumulated in the charge accumulation unit 2212c and the charge accumulation unit 2212d.

In the illustrated example, the frame image is generated by outputting the electric charges in the order of the electric charges that are accumulated in the charge accumulation unit 2212a and the charge accumulation unit 2212b, and the electric charges that are accumulated in the charge accumulation unit 2212c and the charge accumulation unit 2212d. FIG. 9 is a timing diagram illustrating the operation timing of the reset gates Ra, Rb, Rc, and Rd, the distribution gates Txa, Txb, Txc, and Txd, and the output terminals Ta, Tb, Tc, and Td of the charge accumulation units under the same conditions as that illustrated in FIG. 8. In this case, the illustrated timing chart shows the operation timing from frame no. 1 to frame no. 11. Furthermore, the horizontal axis of the illustrated timing chart represents time, and frame nos. 1 to 11 are provided in time series order. Furthermore, the frame period T is 16 msec, and four sections are included in a frame period T.

Part (1) of FIG. 9 shows the timing in which the reset gate Ra passes the electric charges. Part (2) of FIG. 9 shows the timing in which the distribution gate Txa passes the electric charges. Part (3) of FIG. 9 shows the timing in which the output terminal Ta outputs the electric charges. Part (4) of FIG. 9 shows the timing in which the reset gate Rb passes the electric charges. Part (5) of FIG. 9 shows the timing in which the distribution gate Txb passes the electric charges. Part (6) of FIG. 9 shows the timing in which the output terminal Tb outputs the electric charges. Part (7) of FIG. 9 shows the timing in which the reset gate Rc passes the electric charges. Part (8) of FIG. 9 shows the timing in which the distribution gate Txc passes the electric charges. Part (9) of FIG. 9 shows the timing in which the output terminal Tc outputs the electric charges. Part (10) of FIG. 9 shows the timing in which the reset gate Rd passes the electric charges. Part (11) of FIG. 9 shows the timing in which the distribution gate Txd passes the electric charges. Part (12) of FIG. 9 shows the timing in which the output terminal Td outputs the electric charges.

The part (13) of FIG. 9, in the respective sections, shows the charge accumulation units 2212a to 2212d of the destination that distributes the electric charges. In this case, "a" indicates that the charge accumulation unit of the destination that distributes the electric charges is the charge accumulation unit 2212a, "b" indicates that the charge accumulation unit of the destination that distributes the electric charges is the charge accumulation unit 2212b, "c" indicates that the charge accumulation unit of the destination that distributes the electric charges is the charge accumulation unit 2212c, and "d" indicates that the charge accumulation unit of the destination that distributes the electric charges is the charge accumulation unit 2212d.

As illustrated, the controller 12 distributes the electric charges to the charge accumulation unit 2212b in the first section of the frame no. 1, and distributes the electric charges to the charge accumulation unit 2212a in the third section of the frame no. 1 and the first section of the frame no. 2. Furthermore, the controller 12 outputs the electric charges to the charge accumulation units 2212a and 2212b in the third section and the fourth section of the frame no. 2. Furthermore, the image processor 14 generates a frame image based on the output electric charges. Furthermore, the controller 12 distributes the electric charges to the charge accumulation unit 2212d in the second section of the frame no. 2, and distributes the electric charges to the charge accumulation unit 2212c in the fourth section of the frame no. 2 and the second section of the frame no. 3. Furthermore, the controller 12 generates a frame image by outputting the electric charges to the charge accumulation units 2212c and 2212d in the third section and the fourth section of the frame no. 3. Then, the image processor 14 generates a frame image based on the output electric charges. Furthermore, the controller 12 distributes the electric charges to the charge accumulation unit 2212b in the first section of the frame no. 3, and distributes the electric charges to the charge accumulation unit 2212a in the third section of the frame no. 3 and the first section of the frame number 4. Furthermore, the controller 12 outputs the electric charges to the charge accumulation units 2212a and 2212b in the third section and the fourth section of the frame no. 4. Then, the image processor 14 generates a frame image based on the output electric charges. The operation timing in the subsequent frame numbers is as illustrated in the drawing.

By this operation, the image capturing device 1 can generate a frame image to which the FIR filter is applied for each frame period T.

As described above, according to this embodiment of the invention, the photoelectric conversion units 2211a to 2211d provided in the pixel 221 output the electric charges depending on the received light. Furthermore, the charge accumulation units 2212a to 2212d provided in the pixel 221 accumulate the electric charges. Furthermore, the drain electrode 2216 provided in the pixel 221 discards the electric charges. Furthermore, the controller 12 controls the pixel 221 so as to distribute the electric charges that are output by the photoelectric conversion units 2211a to 2211d to the charge accumulation units 2212a to 2212d and the drain electrode 2216 at the distribution ratio depending on the coefficient $a_i$ of the corresponding delay period for each delay period (delay time t caused by the FIR filter z) of the FIR filter that is applied to the images, and reads the electric charges accumulated in the charge accumulation units 2212a to 2212d after the whole delay period of the FIR filter elapses. Furthermore, the image processor 14 generates the image based on the electric charges that are read by the controller 12.

Therefore, the image capturing device 1 according to the embodiment can control the pixels 221 to distribute the electric charges that are output by the photoelectric conversion units 2211a to 2211d to the charge accumulation units 2212a to 2212d and the drain electrode 2216 at the distribution ratio depending on the weight coefficient of the corresponding delay period of the FIR filter that is applied to the images at each delay period, and can generate the images based on the electric charges that are distributed to the charge accumulation unit 2212a to 2212d. Accordingly, the image capturing device 1 according to the embodiment can capture the image to which the time series FIR filter is applied without using many images.

Furthermore, according to the embodiment of the invention, the controller 12 controls the pixel 221 to distribute the electric charges that are output by the photoelectric conversion unit 2211a to 2211d to the different charge accumulation units 2212a to 2212d, respectively, depending on the images.

Therefore, since the image capturing device 1 according to the embodiment of the invention can distribute the electric charges to the different charge accumulation units 2212a to 2212d, respectively, depending on the images, plural images can be captured in parallel.

Furthermore, according to the embodiment of the invention, the controller 12 controls the pixel 221 to distribute the electric charges that are output by the photoelectric conversion units 2211a to 2211d to the different charge accumulation units 2212a to 2212d when the coefficient $a_i$ has a positive value and when the coefficient $a_i$ has a negative value, and the image processor 14 generates the images based on the value which is obtained by subtracting the charge amount of the electric charges that are distributed when the coefficient $a_i$ has a negative value from the charge amount of the electric charges that are distributed when the coefficient $a_i$ has a positive value.

Therefore, even when the coefficients $a_i$ of the FIR filter that is applied to the image have a positive value and a negative value, the image capturing device 1 according to the embodiment of the invention can capture the image to which the time series FIR filter is applied.

Furthermore, according to the embodiment of the invention, the drain gate D provided in the pixel 221 outputs the electric charges that are output by the photoelectric conversion units 2211a to 2211d to the drain electrode 2216 depending on the applied voltage. Furthermore, the distribution gates Txa to Txd provided in the pixel 221 output the electric charges that are output by the photoelectric conversion units 2211a to 2211d to the charge accumulation units 2212a to 2212d depending on the applied voltage. Furthermore, the controller 12 controls the electric charges that are output by the photoelectric conversion units 2211a to 2211d to be distributed to the charge accumulation units 2212a to 2212d and to the drain electrode 2216 by applying the voltage to the drain gate D and the distribution gates Txa to Txd.

Therefore, the controller 12 can distribute the electric charges that are output by the photoelectric conversion units 2211a to 2211d to the drain electrode 2216 and the charge accumulation units 2212a to 2212d by applying the voltage to the drain gate D and the distribution gates Txa to Txd. Accordingly, the controller 12 can distribute the electric charges that are output by the photoelectric conversion units 2211a to 2211d to the drain electrode 2216 and the charge accumulation units 2212a to 2212d at high speed.

A part of the image capturing device 1 according to the above-mentioned embodiment may be embodied by a computer. In this case, the part may be embodied by recording a program for performing the control functions in a computer-readable recording medium and causing a computer system to read and execute the program recorded in the recording medium. Here, the "computer system" includes an OS or hardware such as peripherals.

Examples of the "computer-readable recording medium" include memory devices of portable mediums such as a flexible disk, a magneto-optical disc, a ROM, and a CD-ROM, a hard disk built in the computer system, and the like. The "computer-readable recording medium" may further include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image capturing device comprising:
a photodetector including a plurality of pixels, each having a photoelectric conversion unit outputting electric charges depending on received light, charge accumulation units accumulating the electric charges, and a drain electrode that discards the electric charges;
a finite impulse response filter which is applied to images;
a controller controlling the pixels so as to distribute the electric charges that are output by the photoelectric conversion units to the charge accumulation units and to the drain electrodes at a distribution ratio depending on a weight coefficient of a corresponding delay period of the finite impulse response filter at each delay period, and reading the electric charges accumulated in the charge accumulation units after a whole delay period of the finite impulse response filter elapses; and
an image processor generating the images based on the electric charges that are read by the controller.

2. The image capturing device according to claim 1, wherein the controller controls the pixels so as to distribute the electric charges that are output by the photoelectric conversion units to at least one of the charge accumulation units, respectively, depending on the images.

3. The image capturing device according to claim 1, wherein the controller controls the pixels so as to distribute the electric charges that are output by the photoelectric conversion units to at least one of the charge accumulation units, respectively, depending on whether the weight coefficient is a positive value or a negative value, and
wherein the image processor generates the images based on a value which is obtained by subtracting a charge amount of the electric charges that are distributed when the weight coefficient is a negative value from a charge amount of the electric charges that are distributed when the weight coefficient is a positive value.

4. The image capturing device according to claim 1, wherein the pixel provided in the photodetector includes a drain gate outputting the electric charges that are output by the photoelectric conversion units to the drain electrodes depending on an applied voltage, and distribution gates outputting the electric charges that are output by the photoelectric conversion units to the charge accumulation units depending on the applied voltage, and
wherein the controller controls the electric charges that are output by the photoelectric conversion units to be distributed to the charge accumulation units and to the drain electrodes by applying a voltage to the drain gate and the distribution gates.

5. An image capturing method for an image capturing device, comprising:

outputting, by photoelectric conversion units, electric charges depending on received light;

accumulating, by charge accumulation units, the electric charges;

discarding, by drain electrodes, the electric charges;

performing control, by a controller, to distribute the electric charges that are output by the photoelectric conversion units to the charge accumulation units and to the drain electrodes at a distribution ratio depending on a weight coefficient of a corresponding delay period of a finite impulse response filter that is applied to images at each delay period, and reading the electric charges accumulated in the charge accumulation units after a whole delay period of the finite impulse response filter elapses; and generating, by an image processor, the images based on the electric charges that are read in the charge reading step.

* * * * *